(12) United States Patent
Kinoshita

(10) Patent No.: US 9,645,300 B2
(45) Date of Patent: May 9, 2017

(54) LIGHTING DEVICE

(71) Applicant: KURARAY CO., LTD., Kurashiki-shi (JP)

(72) Inventor: Seiji Kinoshita, Tsukuba (JP)

(73) Assignee: KURARAY CO., LTD., Kurashiki-shi (JP)

( * ) Notice: Subject to any disclaimer, the term of this patent is extended or adjusted under 35 U.S.C. 154(b) by 0 days.

(21) Appl. No.: 14/897,855

(22) PCT Filed: Jun. 13, 2014

(86) PCT No.: PCT/JP2014/065791
§ 371 (c)(1),
(2) Date: Dec. 11, 2015

(87) PCT Pub. No.: WO2014/200096
PCT Pub. Date: Dec. 18, 2014

(65) Prior Publication Data
US 2016/0109638 A1    Apr. 21, 2016

(30) Foreign Application Priority Data

Jun. 13, 2013    (JP) .................................. 2013-124441

(51) Int. Cl.
*F21V 8/00* (2006.01)
*F21S 8/04* (2006.01)
(Continued)

(52) U.S. Cl.
CPC .............. *G02B 6/0038* (2013.01); *F21S 8/04* (2013.01); *G02B 6/0073* (2013.01); *F21Y 2101/00* (2013.01); *F21Y 2105/00* (2013.01)

(58) Field of Classification Search
CPC ........ G02B 6/0038; G02B 6/0073; F21S 8/04
See application file for complete search history.

(56) References Cited

U.S. PATENT DOCUMENTS 5,506,924 A    4/1996  Inoue
2005/0141110 A1*  6/2005  Olczak ................. G02B 5/0221
                                                                     359/831

(Continued)

FOREIGN PATENT DOCUMENTS

JP           3 81907         4/1991
JP         2005 300775       10/2005
(Continued)

OTHER PUBLICATIONS

Extended European Search Report issued Jan. 12, 2017 in European Patent Application No. 14811565.2.

*Primary Examiner* — David V Bruce
(74) *Attorney, Agent, or Firm* — Oblon, McClelland, Maier & Neustadt, L.L.P.

(57) ABSTRACT

A light guide plate has at a bottom surface thereof a recessed strip. The recessed strip has first oblique surfaces and second oblique surfaces, a vertical angle $\theta 1$ formed by the first oblique surfaces facing each other is set in a range of 95° to 110° while an apparent vertical angle $\theta 2$ formed by the second oblique surfaces facing each other is set in a range of 60° to 75°. When defining one side of each of the first oblique surfaces as a first oblique side and one side of each of the second oblique surfaces as a second oblique side and the total length of the first oblique side and second oblique side as a total oblique side length, the ratio of the oblique side length of the second oblique side to the total oblique side length is set in a range of 40% to 65%.

6 Claims, 12 Drawing Sheets

(51) Int. Cl.
    *F21Y 105/00*     (2016.01)
    *F21Y 101/00*     (2016.01)

(56) References Cited

U.S. PATENT DOCUMENTS

| | | |
|---|---|---|
| 2005/0243575 A1 | 11/2005 | Kunimochi |
| 2008/0007970 A1 | 1/2008 | Lee et al. |
| 2008/0130316 A1 | 6/2008 | Kinoshita et al. |
| 2012/0275190 A1 | 11/2012 | Matsumoto et al. |
| 2013/0093980 A1 | 4/2013 | Goto et al. |

FOREIGN PATENT DOCUMENTS

| | | |
|---|---|---|
| JP | 2009 251122 | 10/2009 |
| JP | 2012 164421 | 8/2012 |
| JP | 2012 234801 | 11/2012 |
| JP | 2013 30279 | 2/2013 |
| WO | 2006 013969 | 2/2006 |

\* cited by examiner

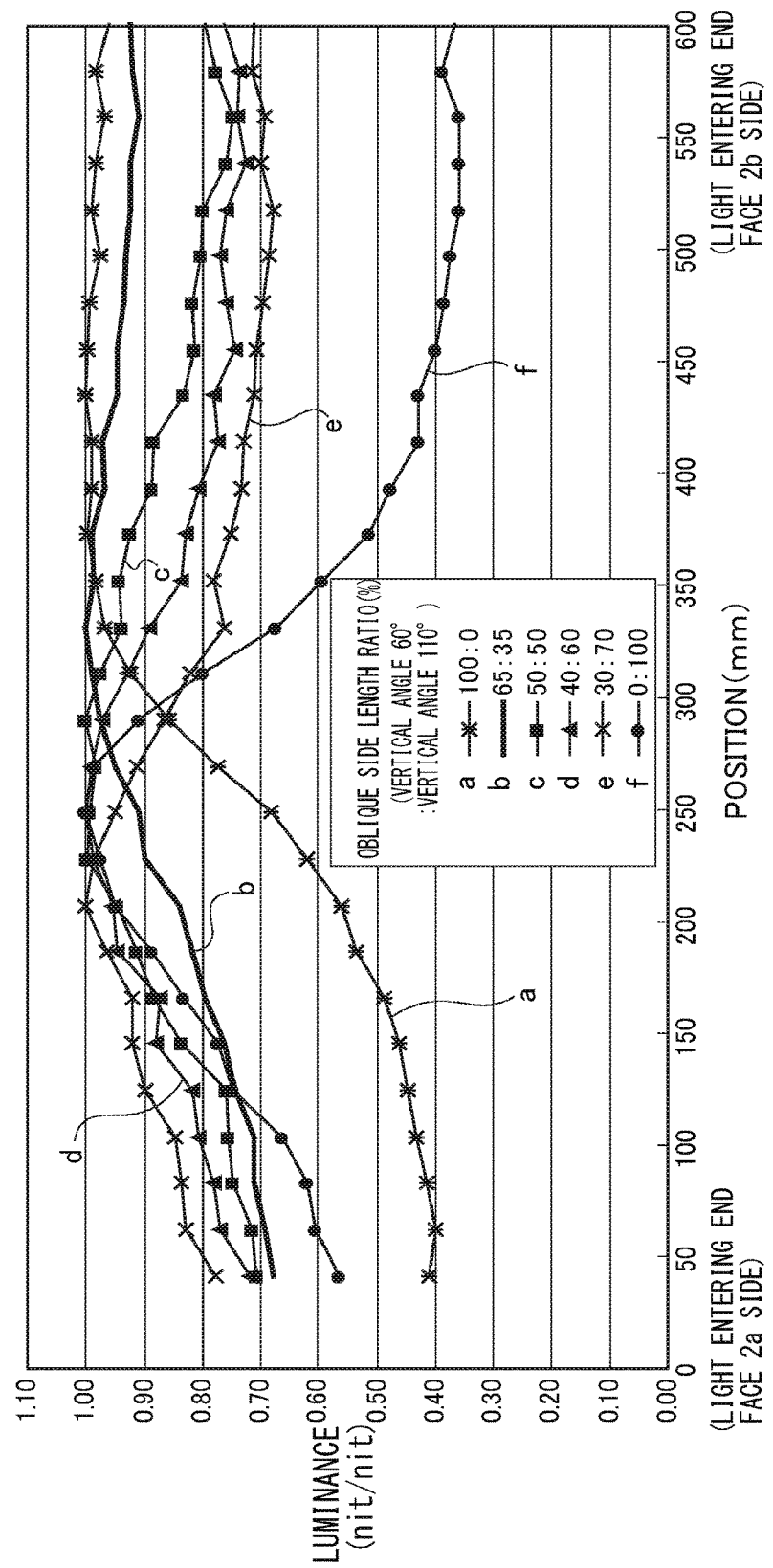

LIGHTING DEVICE

TECHNICAL FIELD

The present invention relates to an edge light-type lighting device wherein light from a primary light source such as an LED disposed on at least one side face side of a light guide plate enters the light guide plate and emits light from one principal plane (light emitting surface) of the light guide plate, and more particularly to an edge light-type lighting device suitable as a lighting device which is used by being attached to a ceiling surface or the like of an office, a house or the like.

BACKGROUND ART

An edge light-type backlight is widely used as a backlight for a liquid crystal display in a liquid crystal television, a personal computer or the like. In an edge light-type backlight, light from a primary light source (e.g., an LED) disposed on at least one side face side of a light guide plate enters the light guide plate and emits from the whole of one principal plane (light emitting surface) of the light guide plate, and therefore the light can be emitted as planar light.

Such an edge light-type backlight therefore has been applied to lighting equipment which is used by attaching to a ceiling surface or the like of an office, a house or the like (see Patent Literature 1, for example).

Furthermore, an edge light-type lighting device having an LED as a light source has been widespread, since improvement in luminous efficiency and the cost reduction of an LED in recent years have enabled weight saving of lighting equipment by thinning and also have realized light performance fitting user's lifestyle using a dimming function, which is a strong point of an LED, in lighting equipment having an LED as a light source (see Patent Literature 2, for example).

Furthermore, in order to further increase light utilization efficiency by a light guide plate, Patent Literature 3, for example, suggests a light guide plate wherein a number of protruded strip patterns each having a trapezoidal cross section are formed on a light emitting surface of the light guide plate at a predetermined pitch and a number of recessed strip patterns each having a V-shaped (V groove-shaped) cross section are formed on a bottom surface, which is a face opposite to the light emitting surface of the light guide plate, at a predetermined pitch.

According to the invention of Patent Literature 3, light which has entered a light guide plate through a light entering end face is efficiently reflected at an oblique surface of each recessed strip pattern, which is formed on a bottom surface and has a V-shaped (V groove-shaped) cross section, toward light emitting surface, and the reflected light is transmitted through each protruded strip pattern, which is formed on a light emitting surface of the light guide plate and has a trapezoidal cross section, and can emit in the front direction of the light emitting surface as planar light.

It is to be noted that the protruded strip patterns on the light emitting surface of the light guide plate are extended in a direction perpendicular to the light entering end face while the recessed strip patterns on the bottom surface (face opposite to the light emitting surface) of the light guide plate are extended in a direction parallel to the light entering end face.

CITATION LIST

Patent Literatures

Patent Literature 1: JP H03-81907 A
Patent Literature 2: JP 2013-30279 A
Patent Literature 3: WO 2006/013969

SUMMARY

Technical Problem

When an edge light-type lighting device having a light guide plate described in Patent Literature 3 is used as lighting equipment after being attached to a ceiling surface or the like of an office, a house or the like, planar light which emits from the light emitting surface can shine substantially evenly on a floor surface immediately below the lighting device and the periphery thereof. However, substantially uniform luminance distribution over the whole light emitting surface is not realized when looking up at the planar light emitting surface of the lighting device attached to the ceiling surface.

Especially, when a user at a position away from an area immediately below the light emitting surface of the lighting device by a predetermined distance looks up at (which will be hereinafter referred to as "oblique view") the light emitting surface at a predetermined inclination angle (which will be hereinafter referred to as "oblique viewing angle") from the light entering end face side of the light guide plate, the luminance significantly changes in a middle area of the light emitting surface under the effect of the V-shaped recessed strip patterns (each having a V-shaped cross section) formed on the bottom surface to be parallel to the light entering end face of the light guide plate, and therefore the middle area looks dark and brightness unevenness is generated.

When brightness unevenness is generated in an oblique view toward the light emitting surface as described above, the external appearance deteriorates and the commodity value lowers.

Therefore, an object of the present invention is to provide an edge light-type lighting device which can realize high immediately-below illuminance and can eliminate brightness unevenness on the light emitting surface in an oblique view.

Solution to Problem

In order to achieve the above object, according to claim 1, there is provided an edge light-type lighting device wherein a primary light source is installed on at least one side face side of a light guide plate, which has a light emitting surface, a bottom surface facing the light emitting surface, and a light entering end face through which light that emits from the primary light source installed on at least one side face enters, wherein when defining a normal line of an X-Y plane composed of an X axis and a Y axis perpendicular to the X axis as a Z axis, the primary light source is disposed parallel to the X axis, the light guide plate is disposed parallel to the X-Y plane, and the light entering end face of the light guide plate is parallel to an X-Z plane, the light guide plate has a plurality of recessed strip patterns, which are formed on the bottom surface at a predetermined pitch and are parallel to the X axis direction, and a plurality of protruded strip patterns, which are formed on the light emitting surface at a predetermined pitch and are parallel to the Y axis direction, each of the recessed strip patterns has first oblique surfaces on an inner side and second oblique surfaces, which are continuous with the first oblique surfaces and have an outward opening, in a cross section parallel to a Y-Z plane, and has a stepped V shape wherein a vertical angle formed by the first oblique surfaces facing each other is set in a range of 95° to 110° while an apparent vertical angle formed between the second oblique surfaces facing each other is set in a range of 60° to 75°, and when defining one side of each of the first oblique surfaces as a first oblique side and one side of each of the second oblique surfaces as a second oblique side in a cross section parallel to the Y-Z plane and defining a total length of the continuous first oblique side and second oblique side as a total oblique side length, a ratio of an oblique side length of the second oblique side to the total oblique side length is set in a range of 40% to 65%.

According to the lighting device of claim 2, each of the protruded strip patterns formed on the light emitting surface of the light guide plate has a trapezoidal, lenticular lens-shaped or parabolic cross section.

According to the lighting device of claim 3, a reflection sheet which reflects light is provided on a bottom surface side of the light guide plate, and a diffusion sheet which uniformly diffuses light is provided on a light emitting surface side of the light guide plate.

According to the lighting device of claim 4, a reflection sheet which reflects light is provided on a bottom surface side of the light guide plate.

Advantageous Effects of Invention

According to a lighting device of the present invention, each recessed strip pattern on a bottom surface of a light guide plate has first oblique surfaces on the inner side and second oblique surfaces, which are continuous with the first oblique surfaces and have an outward opening, in a cross section parallel to the Y-Z plane, and has a stepped V shape wherein a vertical angle formed by the first oblique surfaces facing each other is set in a range of 95° to 110° while an apparent vertical angle formed by the second oblique surfaces facing each other is set in a range of 60° to 75°. When defining one side of each of the first oblique surfaces as a first oblique side and one side of each of the second oblique surfaces as a second oblique side in a cross section parallel to the Y-Z plane and defining the total length of the continuous first oblique side and second oblique side as a total oblique side length, the ratio of the oblique side length of the second oblique side to the total oblique side length is set in a range of 40% to 65%.

As a result, light which emits from the light emitting surface can shine on an area immediately below the lighting device with high illuminance, and brightness unevenness on the light emitting surface in an oblique view can be eliminated.

BRIEF DESCRIPTION OF DRAWINGS

FIG. 16 illustrates a view which shows the measurement result of luminance distribution on a light emitting surface in an oblique view at an oblique viewing angle of 20° when the ratio (oblique side length ratio) of the oblique side length of the second oblique side to the total oblique side length (oblique side length of the first oblique side+the second oblique side) regarding V-shaped recessed strips formed on the bottom surface of the light guide plate of the lighting device according to the second embodiment is changed.

DESCRIPTION OF EMBODIMENTS

Figure 1:
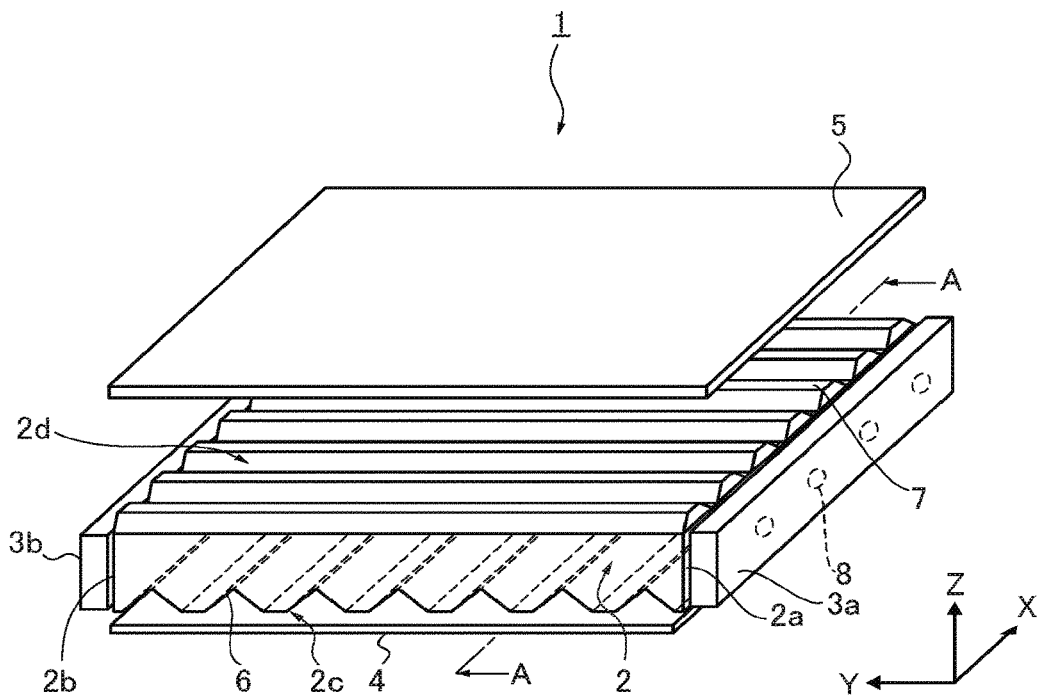
FIG. 1 illustrates an exploded perspective view of an edge light-type lighting device according to an embodiment of the present invention.
Figure 2:
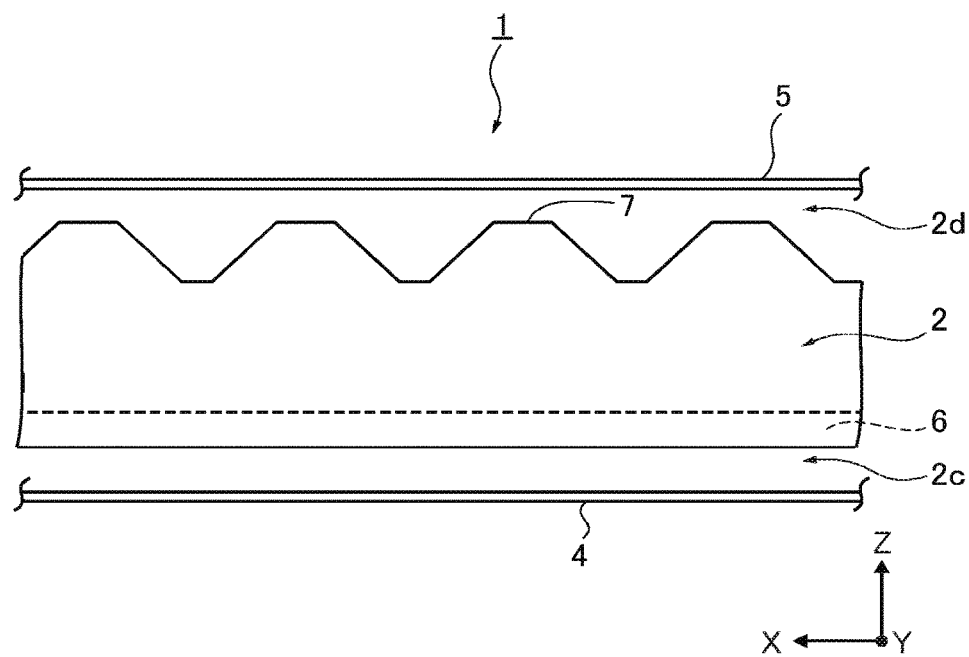
FIG. 2 illustrates a sectional view taken along line A-A of FIG. 1.

FIG. 1 illustrates an exploded perspective view of an edge light-type lighting device according to an example of an embodiment of the present invention, and FIG. 2 illustrates a sectional view taken along line A-A of FIG. 1. According to an edge light-type lighting device 1 of this embodiment, it is to be noted that the Z axis represents the normal line of the X-Y plane composed of the X axis and the Y axis perpendicular to the X axis, and the Z axis direction represents the light emitting direction.

As illustrated in FIGS. 1 and 2, the edge light-type lighting device 1 according to this embodiment is provided with: a light guide plate 2, which is a transparent structure formed of a transparent resin (e.g., acrylic resin) or the like; light emitting units 3a and 3b, which are disposed respectively at end faces (which will be hereinafter referred to as "light emitting end faces") 2a and 2b sides on both sides of the light guide plate 2 in the Y axis direction; a reflection sheet 4, which is installed on a posterior surface (which will be hereinafter referred to as "bottom surface") 2c side of the light guide plate 2; and a diffusion sheet 5, which is installed on an anterior surface (which will be hereinafter referred to as "light emitting surface") 2d side of the light guide plate 2 and functions as an optical sheet, as main components.

Figure 3:
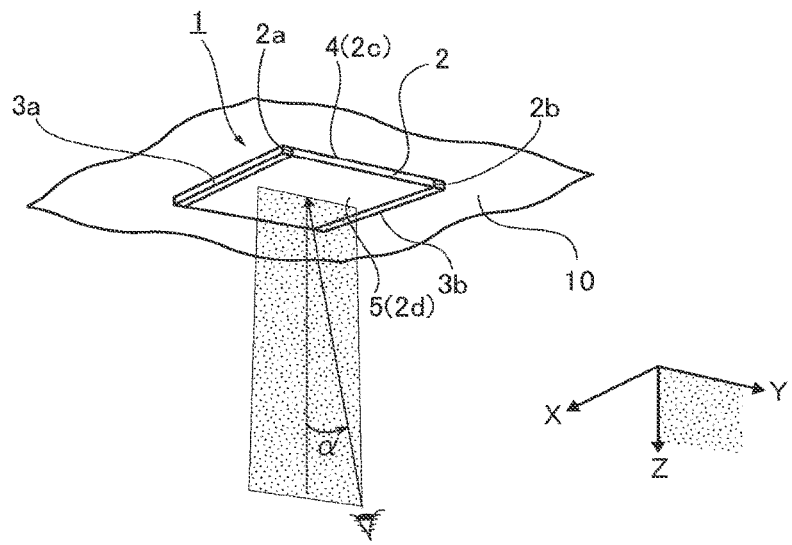
FIG. 3 illustrates a schematic perspective view of a state where a lighting device according to an embodiment is installed on a ceiling surface.

In a case where the lighting device 1 is installed on a ceiling surface of an office, a house or the like, it is to be noted that the reflection sheet 4 side is located on a ceiling surface 10 and light emits downward (toward a floor surface side) from the diffusion sheet 5 side (light emitting surface 2d side) as illustrated in FIG. 3.

A plurality of recessed strips 6, which are extended in the X axis direction and respectively have a V-shaped (V groove-shaped) cross section, are formed on the bottom surface 2c of the light guide plate 2 at a predetermined pitch. Moreover, a plurality of protruded strips 7, which are extended in the Y axis direction and respectively have a trapezoidal cross section, are formed on the light emitting surface 2d of the light guide plate 2 at a predetermined pitch (details of the light guide plate 2 will be described later).

The light emitting units 3a and 3b as primary light sources are disposed along the X axis respectively on the both side end faces (light entering end faces 2a and 2b) in the Y axis direction of the light guide plate 2, and a plurality of LEDs (light emitting diodes) 8 as light sources are disposed in the light emitting units 3a and 3b linearly along the X axis direction of the light guide plate 2 at a predetermined interval. The disposition interval of the LEDs 8 is approximately several millimeters to 20 millimeters, for example. It is to be noted that a continuous light source such as a cold cathode tube may be employed as a light source in place of an LED.

Light emitted from the respective LEDs 8 of the light emitting units 3a and 3b is introduced from the light entering end faces 2a and 2b on both sides of the light guide plate 2 in the Y axis direction in the light guide plate 2. Although the light emitting units 3a and 3b are disposed on both side end faces (light entering end faces 2a and 2b) in the Y axis direction of the light guide plate 2 in the structure of this embodiment, it is to be noted that one light emitting unit may be disposed only on an end face on either side.

The reflection sheet 4 has a function to cause light, which has been emitted outward from the bottom surface 2c of the light guide plate 2, of light, which has entered through the light entering end faces 2a and 2b of the light guide plate 2, to enter again the light guide plate 2. The reflection sheet 4 desirably has reflectance equal to or higher than 95%, so as to enhance the light utilization efficiency. Examples of the material of the reflection sheet 4 include metallic foil such as aluminum, silver or stainless steel, white coating, foamed PET (polyethylene terephthalate) resin, and the like.

The diffusion sheet 5 installed on the light emitting surface 2d side, which is the anterior surface side (front side) of the light guide plate 2, has a function to appropriately uniformize light, which has been emitted from the light emitting surface 2d of the light guide plate 2, so as to suppress brightness unevenness and improve the appearance.

According to a lighting device to be used on a ceiling surface of an office, a house or the like, the light emitting surface (light emitting surface) of the lighting device is viewed directly and therefore the appearance quality is valued. Accordingly, one or a plurality of diffusion sheets are sometimes used. The diffusion sheet 5 may be a plate member (e.g. PMMA, PC or the like) created from resin having diffusibility, or may be a protective cover member formed by thermoforming such a plate and processing the same into a three-dimensional shape. It is to be noted that installation of a diffusion sheet 5 on the light emitting surface 2d side of the light guide plate 2 is not essential, and a diffusion sheet 5 may be omitted according to the installation site, application or the like of the lighting device 1.

(Structure of Bottom Surface 2c of Light Guide Plate 2)

As illustrated in FIG. 1, the recessed strips 6 are formed on the bottom surface 2c of the light guide plate 2 at a predetermined pitch. Each recessed strip 6 is formed to have a V-shaped (V groove-shaped) cross section and is extended in the X axis direction. Specifically, each recessed strip 6 is formed to have a stepped V-shaped (which will be hereinafter referred to simply as "V-shaped") cross section as illustrated in the enlarged view of FIG. 4.

Each recessed strip 6 having a V-shaped cross section is composed of first oblique surfaces 6a on the inner side having a vertical angle θ1 set in a range of 95° to 110°, e.g. 100°, and second oblique surfaces 6b, which are continuous with the first oblique surfaces 6a, form an apparent vertical angle θ2 set in a range of 60° to 75°, e.g. 70°, and have an outward opening (details of the first oblique surfaces 6a and the second oblique surfaces 6b which compose each recessed strip 6 will be described later).

Figure 4:
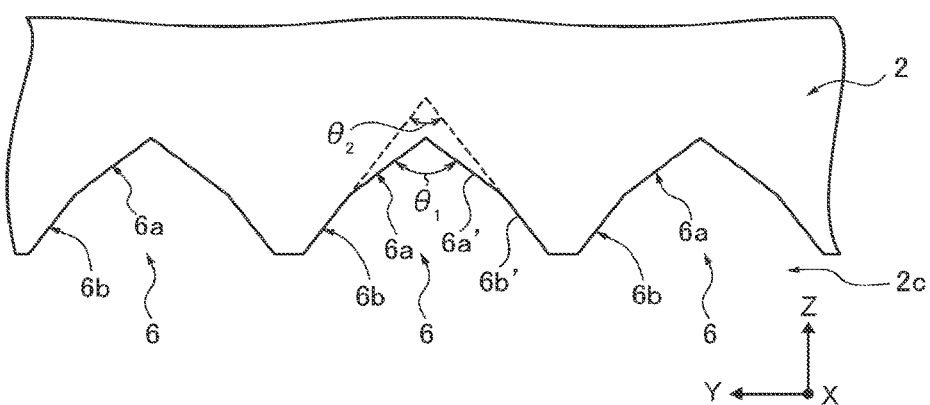
FIG. 4 illustrates an enlarged view of recessed strips, which are formed on a bottom surface of a light guide plate of a lighting device according to an embodiment and respectively have a V-shaped cross section.

According to each recessed strip 6 having a V-shaped cross section illustrated in FIG. 4, it is to be noted that one side of each of the first oblique surfaces 6a will be referred to as a first oblique side 6a' while one side of each of the second oblique surfaces 6b will be referred to as a second oblique side 6b'.

In addition, in this embodiment, when defining the total length of the continuous first oblique side 6a' and second oblique side 6b' as a total oblique side length, the ratio (which will be hereinafter referred to as "oblique side length ratio") of the oblique side length of the second oblique side 6b' to the total oblique side length (oblique side length of the first oblique side 6a'+the second oblique side 6b') is set at approximately 40% to 65%.

(Structure of Light Emitting Surface 2d of Light Guide Plate 2)

As illustrated in FIG. 2, a plurality of protruded strips 7 each having a trapezoidal cross section parallel to the X-Z plane are formed on the light emitting surface 2d of the light guide plate 2 at a predetermined pitch and are extended in the Y axis direction. A general height of the trapezoidal protruded strips 7 is set in a range of 0.001 mm to 0.1 mm, for example, and a general inclination angle of the protruded strips 7 each having a trapezoidal cross section is set in a range of 30° to 60°, for example.

Although each protruded strip 7 formed on the light emitting surface 2d of the light guide plate 2 in this embodiment has a trapezoidal cross section, it is to be noted that each protruded strip 7 may alternatively be a so-called lenticular lens shape having a circular arc-shaped, hyperbolic or parabolic cross section.

Figure 5:
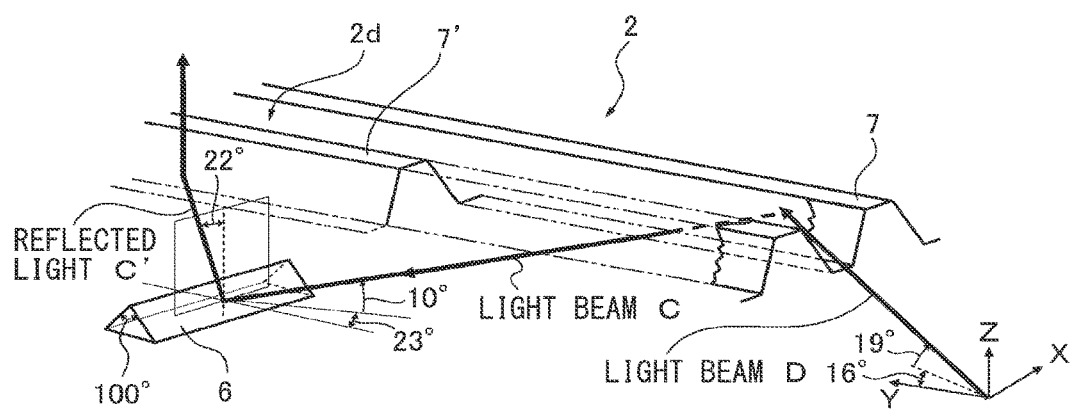
FIG. 5 illustrates a view of a manner that light enters an oblique surface of a recessed strip, which is formed on a bottom surface of a light guide plate of a lighting device according to an embodiment and has a V-shaped cross section, and is reflected toward the light emitting surface side.

Next, a principle that the luminance in the frond direction (Z axis direction) is improved in a case where recessed strips (the vertical angle θ1 of the first oblique surfaces 6a is) 100° 6 each having a V-shaped cross section are formed on the bottom surface 2c of the light guide plate 2 and protruded strips 7 (the inclination angle between an oblique side which composes a cross section and the light emitting surface 2d is 55°) each having a trapezoidal cross section are formed on the light emitting surface 2d of the light guide plate 2 will be described with reference to FIG. 5. It is to be noted that the principle is substantially the same at the second oblique surfaces 6b (the apparent vertical angle θ2 is 70°) of the recessed strips 6 each having a V-shaped cross section.

In the lighting device 1 illustrated in FIG. 1, although light which has entered through the light entering end faces 2a and 2b of the light guide plate 2 is reflected toward a predetermined direction at the V-shaped recessed strips 6 formed on the bottom surface 2c of the light guide plate 2 and emits from the light emitting surface 2d, or is transmitted through the V-shaped recessed strips 6, emits once from the bottom surface 2c of the light guide plate 2, is diffused by the reflection sheet 4 arranged at a lower part, enters again the light guide plate 2 and emits from the light emitting surface 2d, a main part of light which emits in the front direction has been reflected toward a predetermined direction at the V-shaped recessed strips 6 of the bottom surface 2c.

At the light emitting surface 2d (protruded strips 7) and the bottom surface 2c (recessed strips 6) of the light guide plate 2, light which propagates while being totally reflected at planes parallel to the X-Y plane sometimes include light, which enters through an oblique surface of a V-shaped recessed strip 6 provided on the bottom surface 2c of the light guide plate 2 as indicated by a light beam C illustrated in FIG. 5. It is to be noted that the elevation angle of the light beam C to the oblique surface of the recessed strip 6 is 10°, and an angle to the Y axis is 23° in FIG. 5.

The light beam C is totally reflected at the oblique surface of the V-shaped recessed strip 6 toward a direction, which has an angle of 22° to the Z axis on a plane parallel to the light entering end face (X-Z plane), as reflected light C'. A part of the reflected light emits in the front direction (Z axis direction) when emitting from an oblique surface of a protruded strip (protruded strip 7' in FIG. 5), which is formed on the light emitting surface 2d and has a trapezoidal cross section. The luminous intensity of light which emits in the front direction therefore can be improved.

Furthermore, a light beam D of light propagating inside the light guide plate 2 is totally reflected at an oblique surface of a protruded strip (protruded strip 7 in FIG. 5), which is formed on the light emitting surface 2d and has a trapezoidal cross section, and therefore is deflected into a light beam C. That is, the light beam C is doubled by an oblique surface of a protruded strip (protruded strip 7 in FIG. 5), which is formed on the light emitting surface 2d and has a trapezoidal cross section, and the luminous intensity of light which emits in the front direction therefore can be further improved.

It is to be noted that the light beam D has an angle of 19° to the X-Y plane and an angle of 16° to the Y axis in FIG. 5.

According to the lighting device 1 of this embodiment, each recessed strip 6, which is formed on the bottom surface 2c of the light guide plate 2 and has a V-shaped cross section, is composed of the first oblique surfaces 6a, which has a vertical angle θ1 set in a range of 95° to 110°, and the second oblique surfaces 6b, which is continuous with the first oblique surfaces 6a and has an apparent vertical angle θ2 set in a range of 60° to 75° as described above, so as to suppress large partial change in luminance in an oblique view toward the light emitting surface 2d.

When θ1 is smaller than 95°, angle dependency of light which emits from the light emitting surface 2d of the light guide plate 2 becomes strong and a diffusion sheet 5 having high diffusibility therefore becomes necessary in order to enhance the screen quality, which is unfavorable in terms of energy efficiency. When θ1 exceeds 110°, the luminance gradient in the vicinity of the center of the light guide plate 2 along the Y axis direction becomes large, and it becomes impossible to cancel the luminance gradient with the effect of deflection by the second oblique surfaces 6b.

When θ2 is smaller than 60°, it becomes difficult to release the light guide plate from a mold in creating the light guide plate. When θ2 exceeds 75°, the maximum light emitting angle in emitting from the light emitting surface 2d becomes the normal direction, and therefore the effect to lower the light entering end face 2a (light emitting unit 3a) side of the light guide plate 2 and to heighten the light entering end face 2b (light emitting unit 3b) side becomes weaker in an oblique view from below the light emitting unit 3b side of the light guide plate 2.

The following description will explain the reason that it becomes possible to suppress large partial change in the luminance in an oblique view toward the light emitting surface 2d when each recessed strip 6, which is formed on the bottom surface 2c of the light guide plate 2 and has a V-shaped cross section, is composed of the first oblique surfaces 6a, which has a vertical angle θ1 set in a range of 95° to 110°, and the second oblique surfaces 6b, which is continuous with the first oblique surface 6a and has an apparent vertical angle θ2 set in a range of 60° to 75°.

Figure 6:
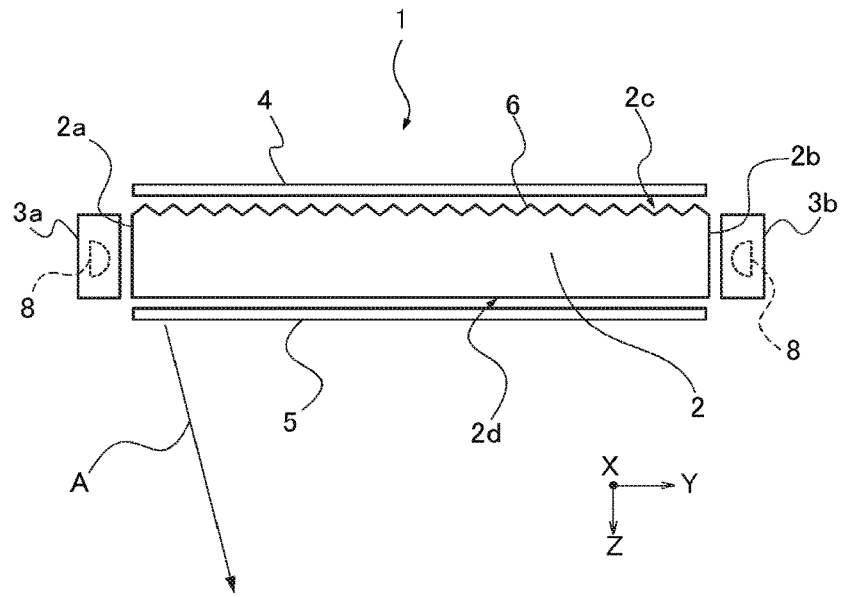
FIG. 6 illustrates a schematic view of the structure of a lighting device to be used for explanation on advantageous effects of the present invention.

It is to be noted that a lighting device to be used here for explanation has a structure illustrated in FIG. 6, wherein the light guide plate 2 has a square shape with one side of 600 mm, has a thickness of 3 mm, and has two light entering end faces 2a and 2b facing each other, the light emitting surface 2*d*, and the bottom surface 2*c*. The structure of the lighting device 1 illustrated in FIG. 6 is similar to that of the lighting device 1 illustrated in FIG. 1. It is to be noted that lenticular lenses each having a circular arc-shaped cross section and an aspect ratio of 20% are formed on the light emitting surface 2*d* of the light guide plate 2 at a constant pitch of 51 μm in place of the trapezoidal protruded strips 7 in the lighting device 1 illustrated in FIG. 1.

The aspect ratio is defined as r/2R (%) when defining the radius of a circle which traces the vertical section of a lenticular lens as R and the distance from the apex of the circular arc which forms the lenticular lens to the chord as r. Moreover, a diffusion sheet 5 (trade name: D124) manufactured by TSUJIDEN Co., Ltd. is provided on the light emitting surface 2*d*.

Each recessed strip 6, which is formed on the bottom surface 2*c* of the light guide plate 2 and has a V-shaped cross section, is composed of first oblique surfaces 6*a*, which has a vertical angle θ1 set at 100°, and second oblique surfaces 6*b*, which is continuous with the first oblique surfaces 6*a* and has an apparent vertical angle θ2 set at 70°, and has a depth of 7 μm and a pitch gradually distributed from 570 μm on the light entering end face side to 100 μm in the middle of the light guide plate 2 (First Embodiment), or is composed of first oblique surfaces 6*a*, which has a vertical angle θ1 set at 110°, and second oblique surfaces 6*b*, which is continuous with the first oblique surface 6*a* and has an apparent vertical angle θ2 set at 60°, and has a depth of 7 μm and a pitch gradually distributed from 840 μm on the light entering end face side to 120 μm in the middle of the light guide plate 2 (Second Embodiment).

First, for the purpose of comparison, a case where a recessed strip, which has a simple V-shaped cross section and a vertical angle of 100° (corresponding to the first oblique surfaces 6*a* of the recessed strip 6 of this embodiment illustrated in FIG. 4), is formed on the bottom surface 2*c* of the light guide plate 2 will be described.

Figure 7:
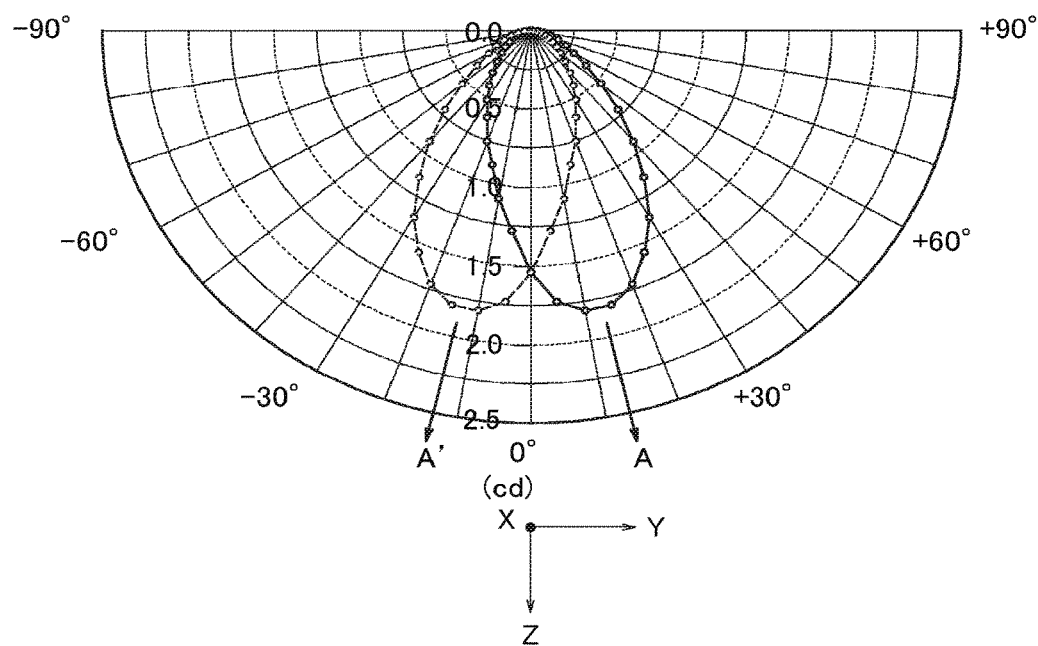
FIG. 7 illustrates a view which shows the measurement result of luminous intensity distribution of light which emits from the light emitting surface of a lighting device (having a structure wherein recessed strips each having a simple V-shaped cross section and a vertical angle of 100° are formed on a bottom surface of a light guide plate) of FIG. 6.

FIG. 7 illustrates the measurement result of luminous intensity distribution (solid line) of light (emitting light) which emits from the light emitting surface 2*d* at a position 60 mm away from the light entering end face 2*a* on the light emitting unit 3*a* side toward the inside when a recessed strip having a simple V-shaped cross section and a vertical angle of 100° is formed on the bottom surface 2*c* of the light guide plate 2.

In the measurement result of luminous intensity distribution illustrated in FIG. 7, the front direction (Z axis direction) of the light emitting surface 2*d* of the light guide plate 2 is represented as a light emitting angle of 0° and, in the Z-Y plane, the light entering end face 2*a* (light emitting unit 3*a*) side is represented as −90° while the light entering end face 2*b* (light emitting unit 3*b*) side is represented as +90°.

It is to be noted that the arrow A direction in FIGS. 6 and 7 represents a light emitting direction of light (emitting light) which emits from the light emitting surface 2*d* at a position 60 mm away from the light entering end face 2*a* on the light emitting unit 3*a* side toward the inside.

In the light intensity distribution (solid line) of emitting light illustrated in FIG. 7, much light emit to the central side of the light guide plate 2 with respect to the Z axis, which is the normal direction of the light emitting surface 2*d* of the light guide plate 2, at a position 60 mm away from the light entering end face 2*a* on the light emitting unit 3*a* side toward the inside.

Furthermore, a number of recessed strips 6 each having a V-shaped cross section are formed on the bottom surface 2*c* of the light guide plate 2 in order to extract more light from the light emitting surface 2*d* of the light guide plate 2. The energy of light, which enters through the light entering end face 2*a* and propagates inside the light guide plate 2, therefore emits from the light emitting surface of the light guide plate 2 before being transmitted through the vicinity of the central portion of the light guide plate 2, and accordingly, there is much emitting light which emits to the central side of the light guide plate 2, such as emitting light represented by the A direction.

The energy of light, which enters through the light entering end face 2*a* and propagates inside the light guide plate 2, however becomes extremely low in a farther area after being transmitted through the vicinity of the central part of the light guide plate 2. Emitting light, which is represented by the A direction, in an area from the light entering end face 2*a* to the central portion of the light guide plate 2 therefore becomes considerably weak in an area beyond the central portion of the light guide plate 2 in spite of an attempt for generation with propagating light which has entered through the light entering end face 2*a*.

On the contrary, in said area, although there is much propagating light from the light entering end face 2*b*, light emission distribution (dotted line) in the A' direction by the propagating light becomes strong as illustrated in FIG. 7, and therefore light emitted in the A direction cannot be increased even if how much propagating light from the light entering end face 2*b* exists.

Figure 8:
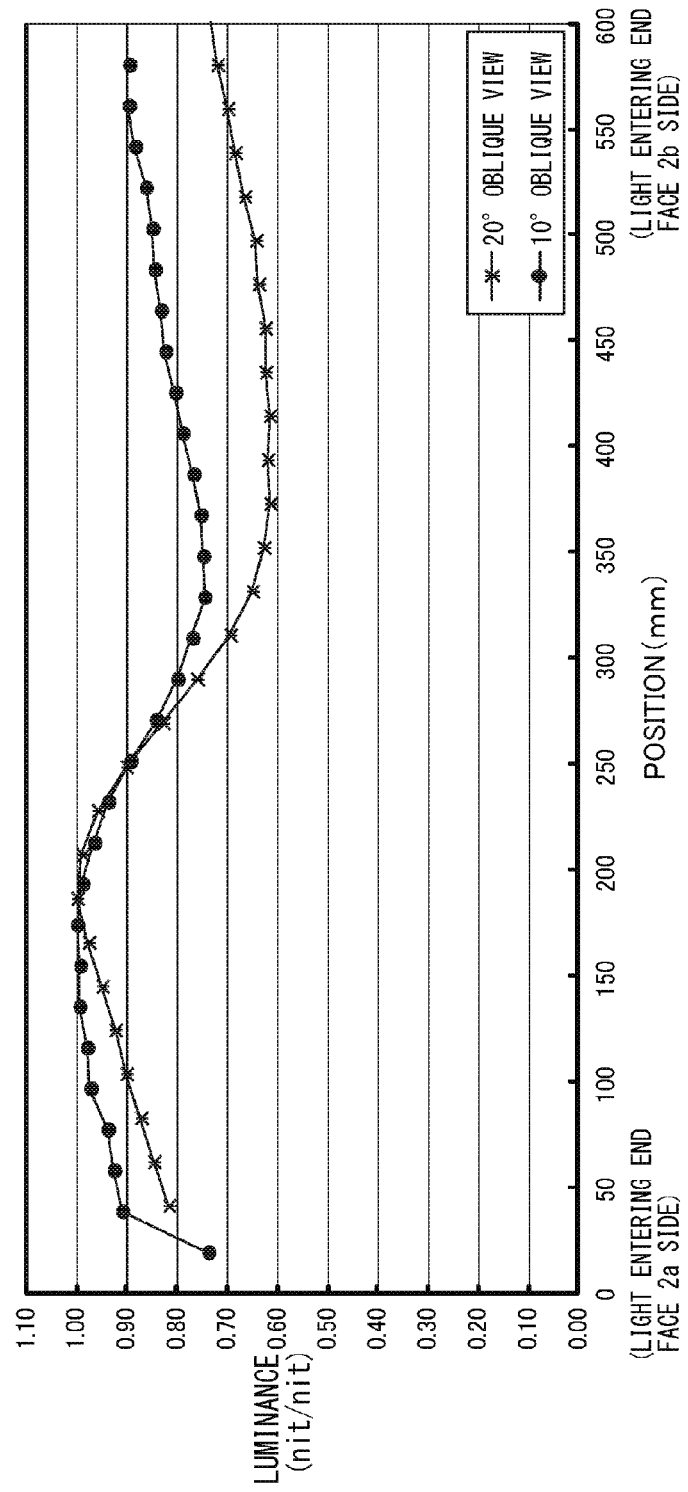
FIG. 8 illustrates a view which shows the measurement result of luminance distribution on a light emitting surface in an oblique view using a lighting device wherein recessed strips each having a simple V-shaped cross section and a vertical angle of 100° are formed on a bottom surface of a light guide plate.

Therefore, in an oblique view from below the light entering end face 2*b* (light emitting unit 3*b*) side of the light guide plate 2, the luminance from the light entering end face 2*a* to the central portion of the light guide plate 2 becomes high, the luminance from the central portion to the light entering end face 2*b* side becomes low, and the luminance gradient becomes large in the vicinity of the central portion of the light guide plate 2 in luminance distribution along the Y axis direction when setting the light entering end face 2*a* of the light guide plate 2 as the origin of the Y axis as illustrated in FIG. 8.

FIG. 8 illustrates the measurement result of luminance distribution when the oblique viewing angle α (see FIG. 3) is 10° and 20°. The horizontal axis represents a position (mm) from one end face (0 mm: end face on the light entering end face 2*a* (light emitting unit 3*a*) side) to the other end face (600 mm: end face on the light entering end face 2*b* (light emitting unit 3*b*) side) in a central portion along the Y axis direction of the light guide plate 2, while the vertical axis represents luminance.

In a case where a recessed strip 6 having a vertical angle of 100° is formed on the bottom surface 2*c* of the light guide plate 2 as described above, the luminance gradient in the vicinity of the central portion of the light guide plate 2 along the Y axis direction is large in an oblique view from below the light emitting unit 3*b* side of the light guide plate 2. Therefore, in an oblique view from below the light emitting unit 3*b* side of the light guide plate 2, the luminance largely changes in the vicinity of the central portion of the light guide plate 2, and accordingly, the vicinity of the central portion of the light guide plate 2 along the Y axis direction looks darker than a surrounding area to the user (looks as brightness unevenness).

Next, a case where a recessed strip (corresponding to the second oblique surface 6*b* of the recessed strip 6 of this embodiment illustrated in FIG. 4), which has a simple V-shaped cross section and a vertical angle of 70°, is formed on the bottom surface 2*c* of the light guide plate 2 will be described.

Figure 9:
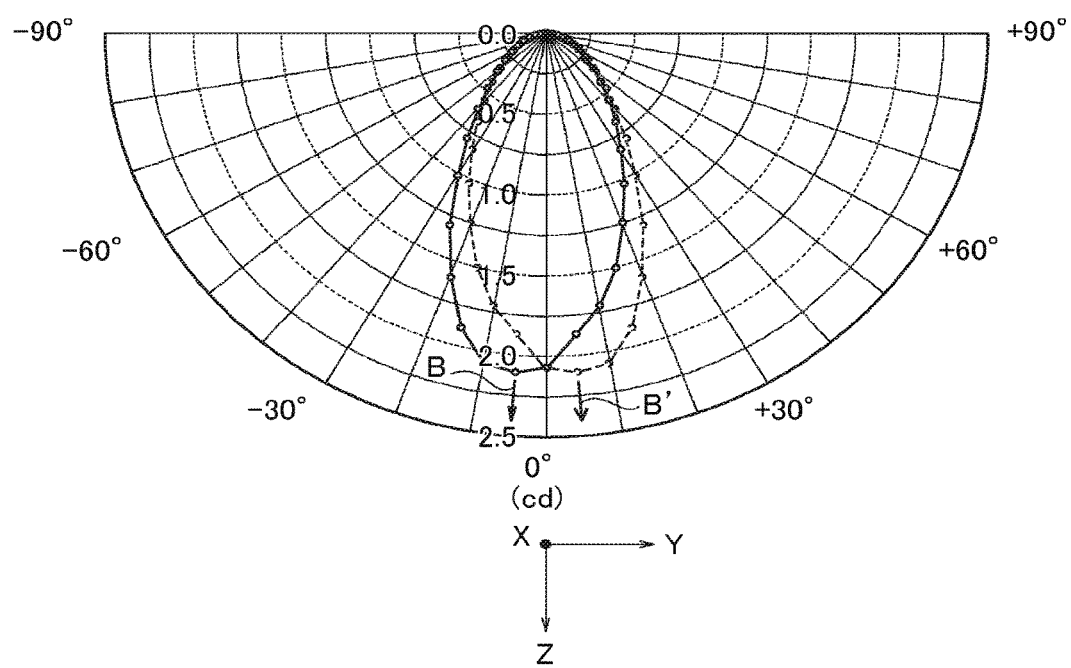
FIG. 9 illustrates a view which shows the measurement result of luminous intensity distribution of light which emits from the light emitting surface when recessed strips each having a simple V-shaped cross section and a vertical angle of 70° are formed on a bottom surface of a light guide plate.

FIG. 9 illustrates the measurement result of luminance intensity distribution (solid line) of light (emitting light) which emits from the light emitting surface 2d at a position 60 mm away from the light entering end face 2a on the light emitting unit 3a side toward the inside when a recessed strip, which has a simple V-shaped cross section and a vertical angle of 70°, is formed on the bottom surface 2c of the light guide plate 2.

In the measurement result of the luminance intensity distribution (solid line) illustrated in FIG. 9, the front direction (Z axis direction) of the light emitting surface 2d of the light guide plate 2 of FIG. 6 is represented as a light emitting angle of 0° and, in the Z-Y plane, the light entering end face 2a (light emitting unit 3a) side is represented as −90° while the light entering end face 2b (light emitting unit 3b) side is represented as +90°.

In such measurement, a recessed strip 6 having a vertical angle of 70° is formed on the bottom surface 2c of the light guide plate 2. It is to be noted that the arrow B direction in FIG. 9 represents the light emitting direction of light (emitting light) which emits from the light emitting surface 2d at a position 60 mm away from the light entering end face 2a on the light emitting unit 3a side toward the inside.

In the luminance intensity distribution (solid line) of emitting light illustrated in FIG. 9, more light emits to the light entering end face 2a (light emitting unit 3a) side than the case of the recessed strip 6 having a vertical angle of 100° with respect to the Z axis, which is the normal direction of the light emitting surface 2d of the light guide plate 2. This indicates that light, which emits to the light entering end face 2a (light emitting unit 3a) side, of light, which emits from the light emitting surface 2d, has high energy.

Therefore, although much propagating light exists in light, which emits from the light emitting unit 3a (LED 8) on the light entering end face 2a side and enters the light guide plate 2, before reaching the vicinity of the central portion of the light guide plate 2, the luminance does not increase before reaching the vicinity of the central portion of the light guide plate 2 in an oblique view from below the light entering end face 2b (light emitting unit 3b) side of the light guide plate 2, since light emits from the light emitting surface 2d in the B direction as illustrated in FIG. 9.

In addition, although the amount of light propagating in the light guide plate 2 along the Y axis direction to the light entering end face 2b side after exceeding the vicinity of the central portion of the light guide plate 2 along the Y axis direction, propagating light, which enters the light guide plate 2 through the light emitting unit 3b on the light entering end face 2b side, can cause light (luminous intensity distribution of emitting light shown by dotted line) to emit from the light emitting surface 2d in the B' direction.

Figure 10:
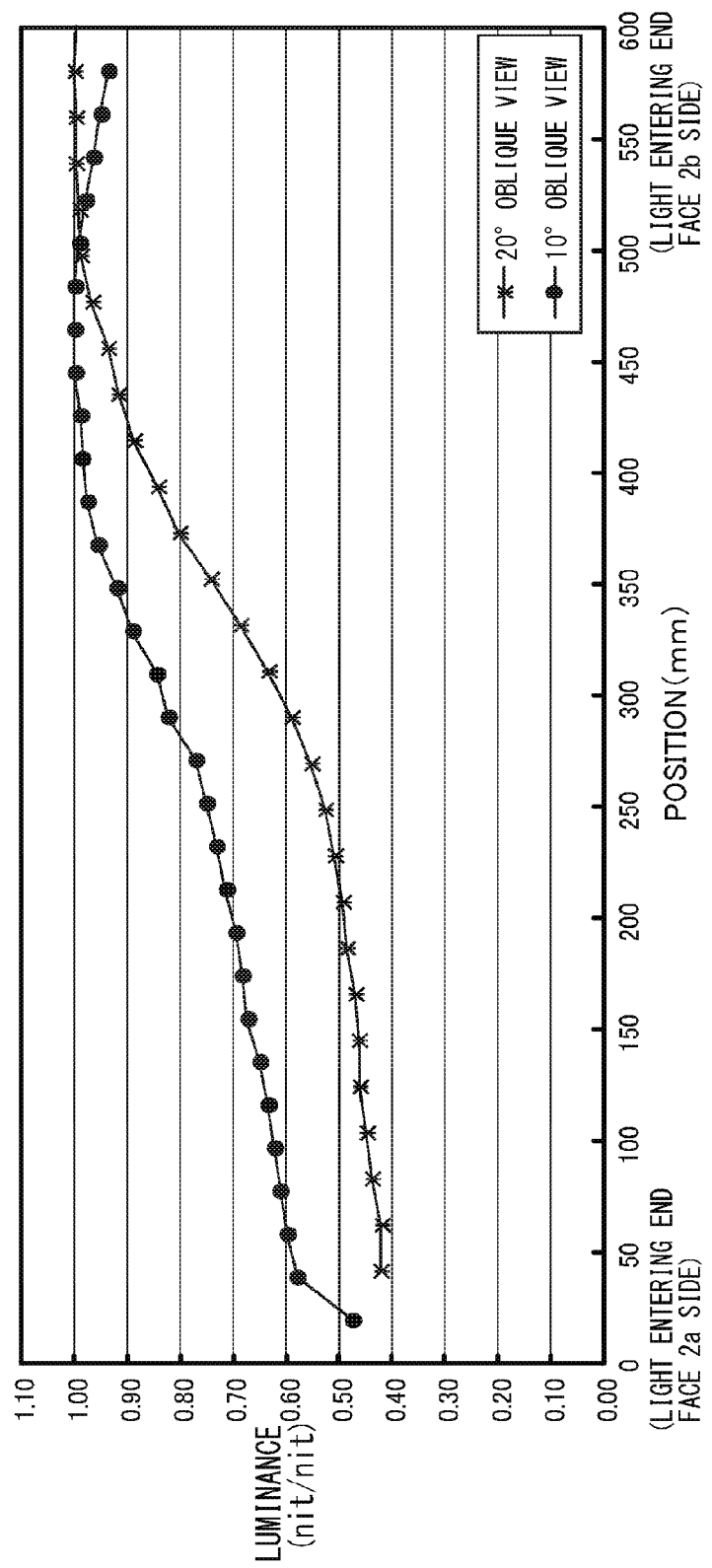
FIG. 10 illustrates a view which shows the measurement result of luminance distribution on a light emitting surface in an oblique view using a lighting device wherein recessed strips each having a simple V-shaped cross section and a vertical angle of 70° are formed on a bottom surface of a light guide plate.

Therefore, in an oblique view from below the light entering end face 2b (light emitting unit 3b) side of the light guide plate 2, a simple luminance gradient is obtained wherein the luminance on the light entering end face 2a (light emitting unit 3a) side of the light guide plate 2 becomes low while the luminance on the light entering end face 2b (light emitting unit 3b) side becomes high, when setting the light entering end face 2a of the light guide plate 2 as the origin of the Y axis as illustrated in FIG. 10.

FIG. 10 illustrates the measurement result of luminance distribution when the oblique viewing angle α (see FIG. 3) is 10° and 20°. The horizontal axis represents a position (mm) from one end face (0 mm: end face on the light entering end face 2a (light emitting unit 3a) side) to the other end face (600 mm: end face on the light entering end face 2b (light emitting unit 3b) side) in a central portion along the Y axis direction of the light guide plate 2, while the vertical axis represents luminance.

In a case where a recessed strip 6 having a vertical angle of 70° is formed on the bottom surface 2c of the light guide plate 2 as described above, a simple luminance gradient is obtained wherein the luminance on the light entering end face 2a (light emitting unit 3a) side of the light guide plate 2 becomes low while the luminance on the light entering end face 2b (light emitting unit 3b) side becomes high in an oblique view from below the light emitting unit 3b side of the light guide plate 2.

Accordingly, by synthesizing the respective luminance distributions illustrated in FIGS. 8 and 10, the luminance on the side of an oblique view can be heightened and the luminance on the side facing the same can be lowered, regarding the luminance gradient from the light entering end face 2a (light emitting unit 3a) to the light entering end face 2b (light emitting unit 3b) of the light guide plate 2 along the Y axis direction in an oblique view. As a result, a monotonous luminance gradient having no large local change in luminance can be realized, and therefore, luminance unevenness in an oblique view by a user (viewer) of the light emitting surface 2d can be reduced and the external appearance can be improved.

That is, in the first embodiment wherein each recessed strip 6, which is formed on the bottom surface 2c of the light guide plate 2 and has a V-shaped cross section, is composed of the first oblique surfaces 6a, which form a vertical angle θ1 set at 100°, and the second oblique surfaces 6b, which are continuous with the first oblique surfaces 6a and have an apparent vertical angle θ2 set at 70°, as illustrated in FIG. 4, it is possible to decrease change in luminance distribution between the light entering end face 2b (light emitting unit 3b) and the light entering end face 2a (light emitting unit 3a) in the vicinity of the center of the light guide plate 2 along the Y axis direction in an oblique view toward the light emitting surface 2d.

Next, according to a lighting device 1 having a light guide plate 2 of a first embodiment, luminance distribution on the light guide plate 2 along the Y axis direction in an oblique view from below the light entering end face 2b (light emitting unit 3b) side of the light guide plate 2 was measured.

Figure 11:
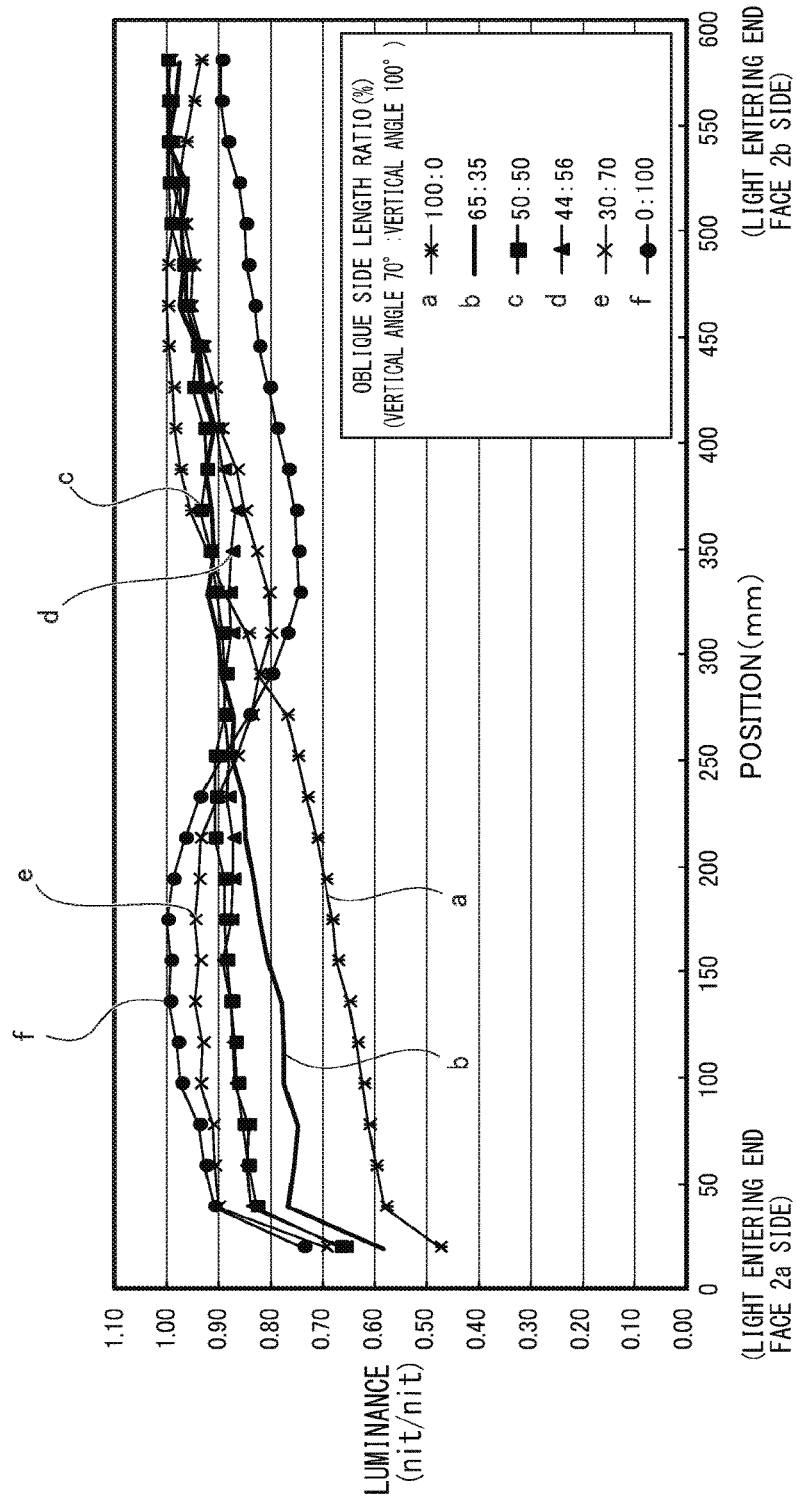
FIG. 11 illustrates a view which shows the measurement result of luminance distribution on a light emitting surface in an oblique view at an oblique viewing angle of 10° when the ratio (oblique side length ratio) of the oblique side length of the second oblique side to the total oblique side length (oblique side length of the first oblique side+the second oblique side) regarding V-shaped recessed strips formed on a bottom surface of a light guide plate of a lighting device according to a first embodiment is changed.
Figure 12:
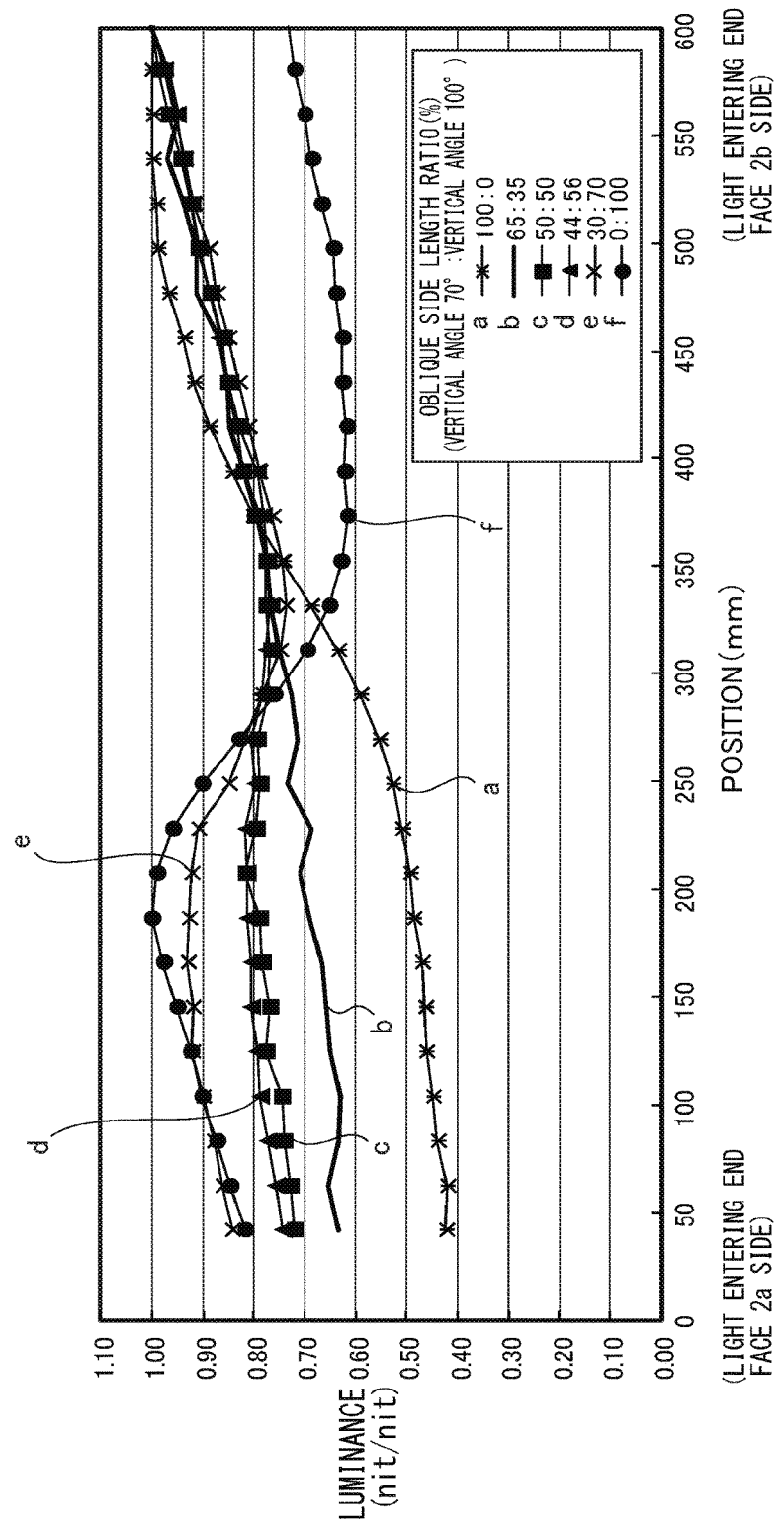
FIG. 12 illustrates a view which shows the measurement result of luminance distribution on a light emitting surface in an oblique view at an oblique viewing angle of 20° when the ratio (oblique side length ratio) of the oblique side length of the second oblique side to the total oblique side length (oblique side length of the first oblique side+the second oblique side) regarding V-shaped recessed strips formed on the bottom surface of the light guide plate of the lighting device according to the first embodiment is changed.

FIG. 11 illustrates the measurement result of luminance distribution on the light emitting surface 2d in an oblique view from the light emitting unit 3b side with an oblique viewing angle α (see FIG. 3) of 10°, and FIG. 12 illustrates the measurement result of luminance distribution on the light emitting surface 2d in an oblique view from the light emitting unit 3b side with an oblique viewing angle α (see FIG. 3) of 20°.

In FIGS. 11 and 12, it is to be noted that the horizontal axis represents a position (mm) from one end face (0 mm: end face on the light entering end face 2a (light emitting unit 3a) side) to the other end face (600 mm: end face on the light entering end face 2b (light emitting unit 3b) side) in a central portion along the Y axis direction of the light guide plate 2, while the vertical axis represents luminance.

The light guide plate 2 used in the measurement has a square shape with one side of 600 mm, and has a thickness of 3 mm. A recessed strip (the vertical angle θ1 of the first oblique surface 6a is 100°, and the apparent vertical angle θ2 of the second oblique surface 6b is 70°) 6 having a V-shaped cross section is formed on the bottom surface 2c, and a protruded strip of a lenticular lens-shaped cross section (aspect ratio: 20%) is formed on the light emitting surface 2d of the light guide plate 2. It is to be noted that the aspect ratio is defined as r/2R (%) when defining the radius of a circle which traces the vertical section of a lenticular lens as R and the distance from the apex of the circular arc which forms the lenticular lens to the chord as r.

In cases where the oblique viewing angle α (see FIG. 3) was 10° and 20°, as is clear from the measurement result in FIGS. 11 and 12, change in luminance distribution was small (especially, the luminance gradient in the vicinity of the central portion (around 200 mm to 400 mm on the horizontal axis in FIGS. 11 and 12) was small) and uniformity of luminance distribution on the light emitting surface 2d was at a level having no problem in practical use when the oblique side length ratio (the ratio (%) of the oblique side length of the second oblique surface 6b to the total oblique side length) was set at 44%, 50% and 65% (d, c and b in FIGS. 11 and 12).

In cases where the oblique viewing angle α was 10° and 20°, it is to be noted that uniformity of luminance distribution on the light emitting surface 2d was at a level having no problem in practical use even when the oblique side length ratio (the ratio (%) of the oblique side length of each of the second oblique surface 6b to the total oblique side length) was set at approximately 40%.

In the measurement result in FIGS. 11 and 12, in a case where the oblique side length ratio (the ratio (%) of the oblique side length of the second oblique surface 6b to the total oblique side length) was set at 65% (b in FIGS. 11 and 12), the luminance gradually lowers from the side of an oblique view to the opposite side, and therefore the apparent ununiformity of luminance distribution was at an unremarkable level.

Moreover, in the measurement result in FIGS. 11 and 12, when the oblique side length ratio (the ratio (%) of the oblique side length of each of the second oblique surfaces 6b to the total oblique side length) was set at 30% and 0% (e and f in FIGS. 11 and 12), the luminance largely changed in the middle area of the light emitting surface 2d and brightness unevenness was generated.

In addition, in the measurement result in FIGS. 11 and 12, when the oblique side length ratio (the ratio (%) of the oblique side length of each of the second oblique surfaces 6b to the total oblique side length) was set at 100% (a in FIGS. 11 and 12), a luminance difference between both ends of the light emitting surface 2d was large, and luminance on the light entering end face 2a side looked dark apparently.

As described above, with the lighting device 1 having the light guide plate 2 according to the first embodiment, it is possible to suppress large change in luminance distribution on the light emitting surface 2d in an oblique view, by setting the ratio (oblique side length ratio) of the second oblique side 6b' to the total oblique side length (oblique side length of the first oblique side 6a'+the second oblique side 6b') at 40% to 65% in a recessed strip (the vertical angle θ1 of each of the first oblique surfaces 6a is 100°, and the apparent vertical angle θ2 of the second oblique surface 6b is) 70° 6, which is formed on the bottom surface 2c of the light guide plate 2 and has a V-shaped cross section.

Accordingly, light which emits from the light emitting surface 2d can shine on an area immediately below the lighting device 1 with high illuminance, brightness unevenness on the light emitting surface in an oblique view is eliminated, and deterioration of external appearance can be prevented.

Next, details of a lighting device 1 having a light guide plate 2 according to a second embodiment will be described. It is to be noted that the basic structure of the lighting device 1 is similar to that of the lighting device 1 (FIG. 6) of the first embodiment, and therefore overlap explanation will be omitted.

In the second embodiment, each recessed strip 6, which is formed on the bottom surface 2c of the light guide plate 2 illustrated in FIG. 4 and has a V-shaped cross section, is composed of the first oblique surfaces 6a, which form a vertical angle θ1 set at 110°, and the second oblique surfaces 6b, which are continuous with the first oblique surfaces 6a and have an apparent vertical angle θ2 set at 60°. The rest part has the same form as that of the first embodiment described above, so as to suppress large partial change in luminance on the light emitting surface 2d in an oblique view.

Figure 13:
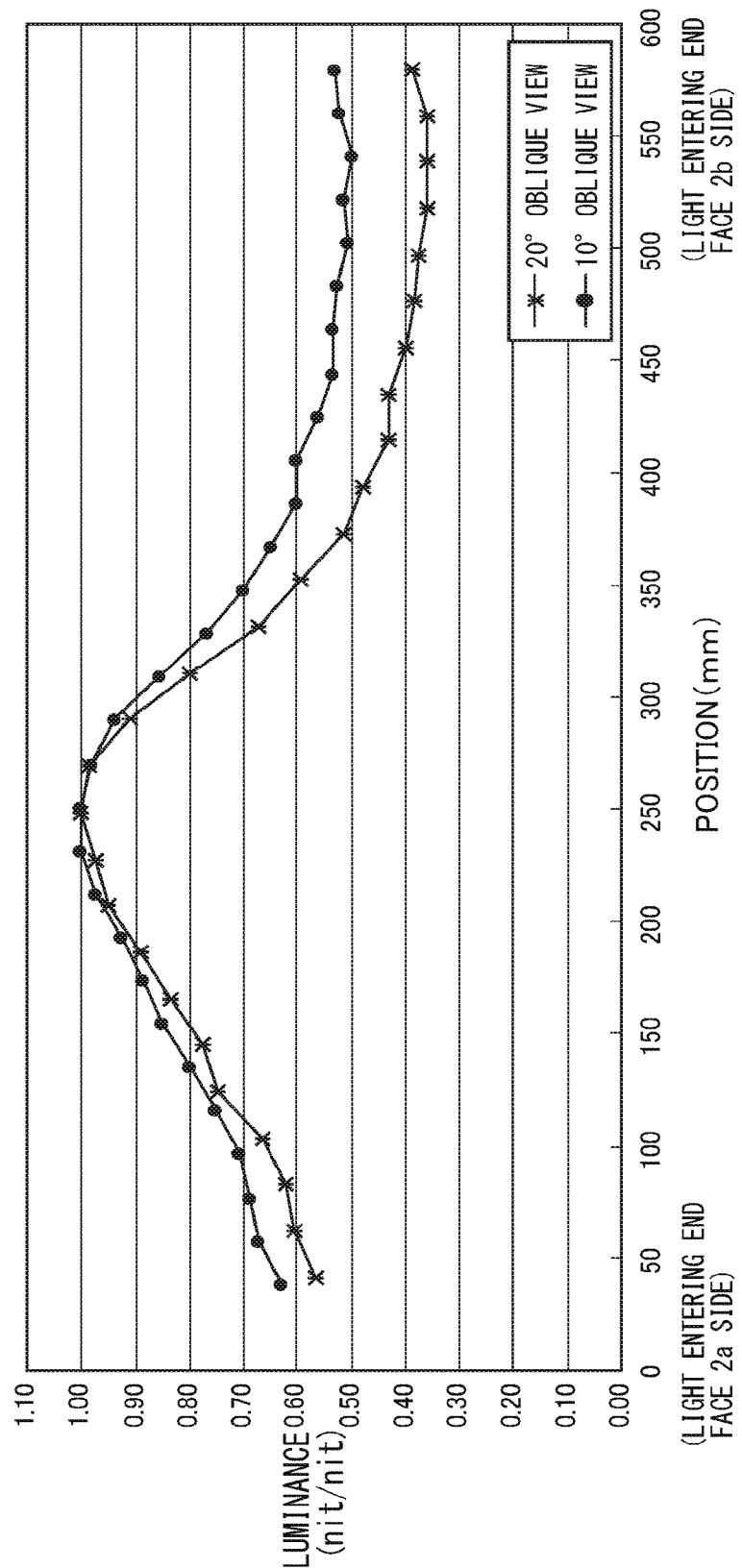
FIG. 13 illustrates a view which shows the measurement result of luminance distribution on a light emitting surface in an oblique view using a lighting device wherein recessed strips each having a simple V-shaped cross section and a vertical angle of 110° are formed on a bottom surface of a light guide plate.
Figure 14:
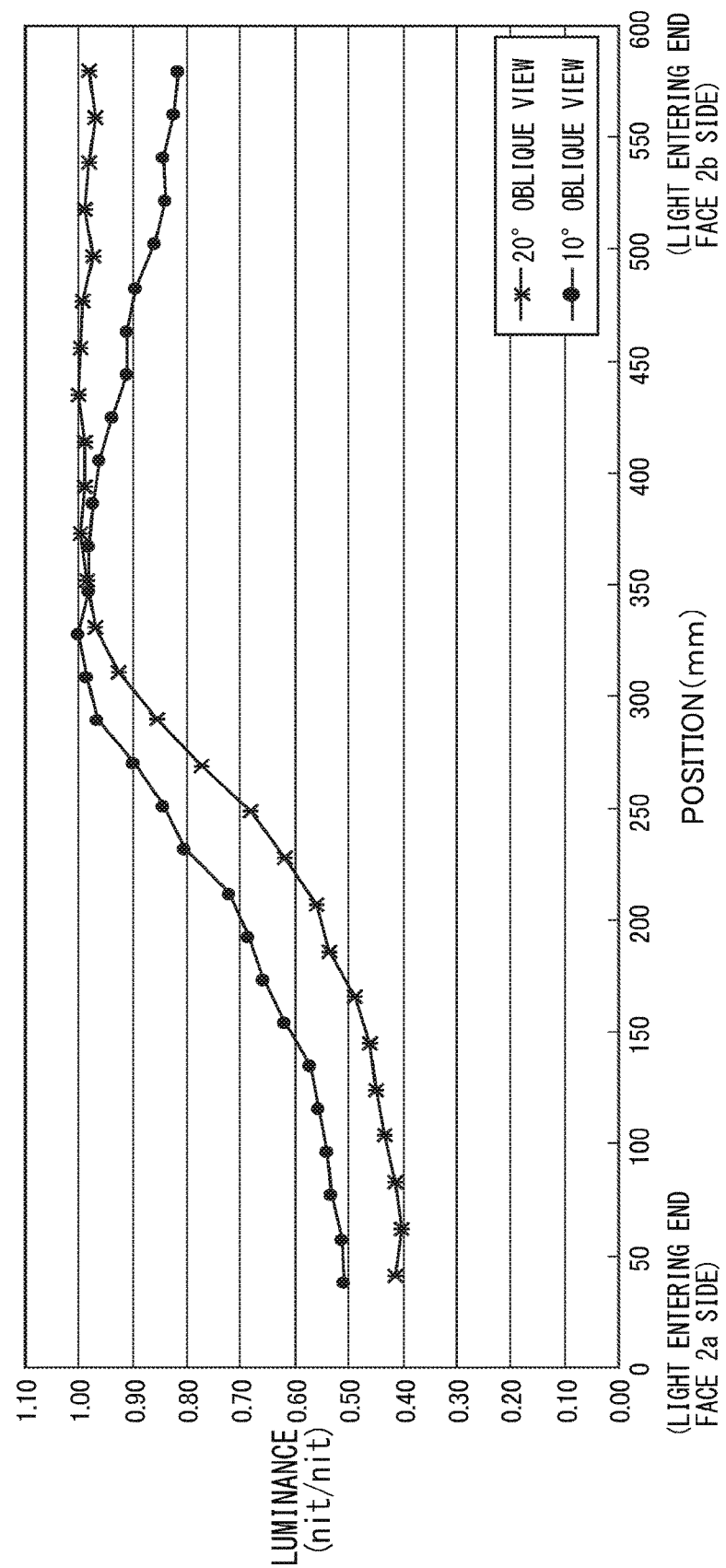
FIG. 14 illustrates a view which shows the measurement result of luminance distribution on a light emitting surface in an oblique view using a lighting device wherein recessed strips each having a simple V-shaped cross section and a vertical angle of 60° are formed on a bottom surface of a light guide plate.

In addition, similar to the first embodiment, FIG. 13 illustrates the measurement result of luminance distribution when a recessed strip 6, which has a simple V-shaped cross section and a vertical angle of 110°, is formed on the bottom surface 2c of the light guide plate 2 and when the oblique viewing angle α (see FIG. 3) is 10° and 20°, and FIG. 14 illustrates the measurement result of luminance distribution when a recessed strip 6, which has a simple V-shaped cross section and a vertical angle of 60°, is formed on the bottom surface 2c of the light guide plate 2 and when the oblique viewing angle α (see FIG. 3) is 10° and 20°.

In FIGS. 13 and 14, the horizontal axis represents a position (mm) from one end face (0 mm: end face on the light entering end face 2a (light emitting unit 3a) side) to the other end face (600 mm: end face on the light entering end face 2b (light emitting unit 3b) side) in a central portion along the Y axis direction of the light guide plate 2, while the vertical axis represents luminance.

Similar to the first embodiment, by synthesizing the respective luminance distributions illustrated in FIGS. 13 and 14, the luminance gradient from the light entering end face 2a (light emitting unit 3a) to the light entering end face 2b (light emitting unit 3b) of the light guide plate 2 along the Y axis direction in an oblique view can be shifted from monotonous increase to monotonous decrease. Since a luminance gradient having no large local change in luminance can be realized as described above, luminance unevenness in an oblique view by a user (viewer) toward the light emitting surface 2d can be reduced, and the external appearance can be improved.

Next, according to a lighting device 1 having a light guide plate 2 of the second embodiment, luminance distribution in the light guide plate 2 along the Y axis direction in an oblique view from below the light entering end face 2b (light emitting unit 3b) side of the light guide plate 2 was measured.

Figure 15:
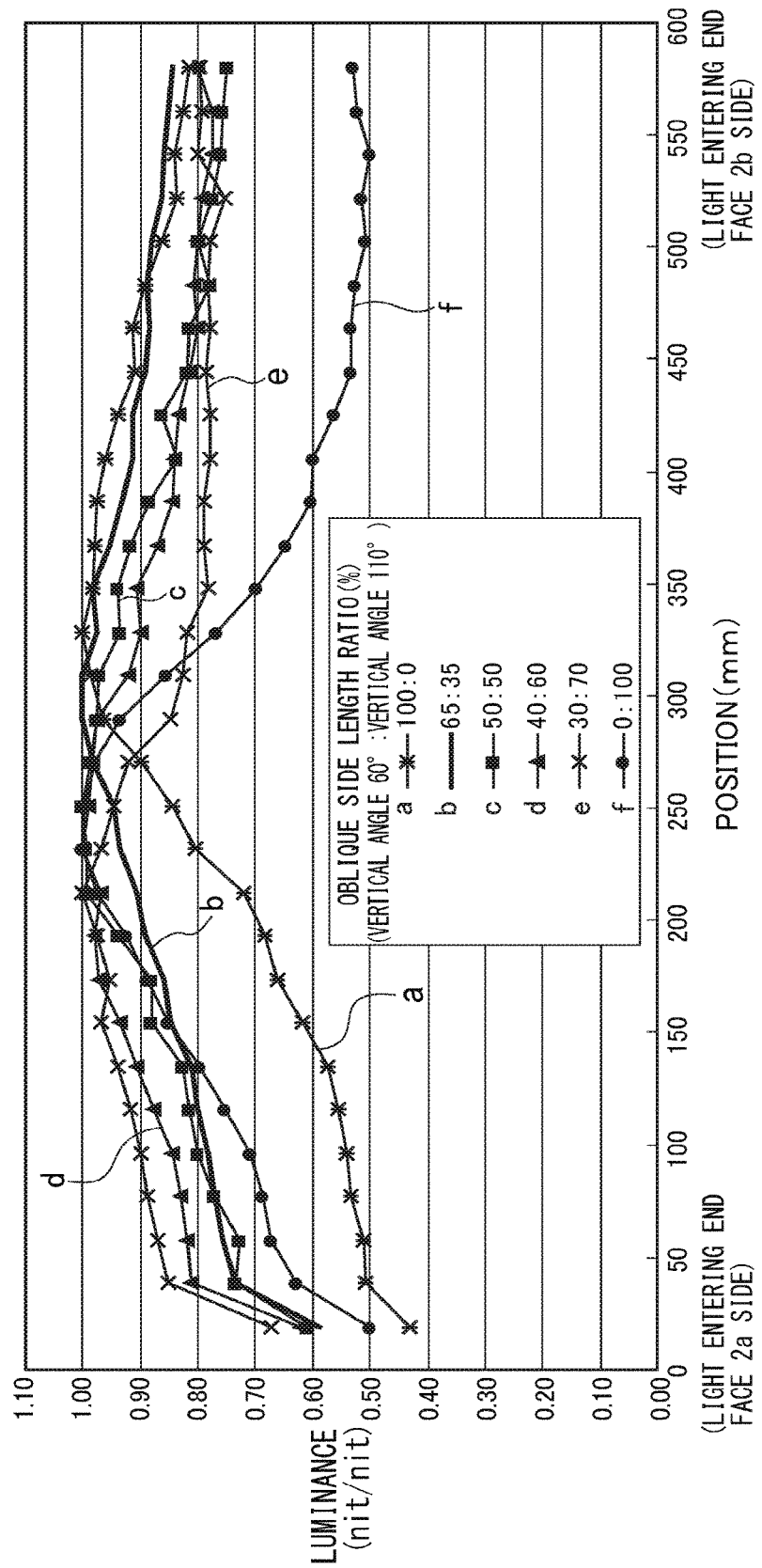
FIG. 15 illustrates a view which shows the measurement result of luminance distribution on a light emitting surface in an oblique view at an oblique viewing angle of 10° when the ratio (oblique side length ratio) of the oblique side length of the second oblique side to the total oblique side length (oblique side length of the first oblique side+the second oblique side) regarding V-shaped recessed strips formed on a bottom surface of a light guide plate of a lighting device according to a second embodiment is changed.

FIG. 15 illustrates the measurement result of luminance distribution on the light emitting surface 2d in an oblique view at an oblique viewing angle α (see FIG. 3) of 10° from the light emitting unit 3b side, and FIG. 16 illustrates the measurement result of luminance distribution on the light emitting surface 2d in an oblique view at an oblique viewing angle α (see FIG. 3) of 20° from the light emitting unit 3b side.

In cases where the oblique viewing angle α was 10° and 20°, as is clear from the measurement result in FIGS. 15 and 16, change in luminance distribution was small (especially, the luminance gradient in the vicinity of the central portion (around 200 mm to 400 mm on the horizontal axis in FIGS. 15 and 16) was small) and uniformity of luminance distribution on the light emitting surface 2d was at a level having no problem in practical use when the oblique side length ratio (the ratio (%) of the oblique side length of the second oblique surface 6b to the total oblique side length) was set at 40%, 50% and 65% (d, c and b in FIGS. 15 and 16).

Moreover, in the measurement result in FIGS. 15 and 16, when the oblique side length ratio (the ratio (%) of the oblique side length of each of the second oblique surfaces 6b to the total oblique side length) was set at 30% and 0% (e and f in FIGS. 15 and 16), the luminance largely changed in the middle area of the light emitting surface 2d and brightness unevenness was generated.

In addition, in the measurement result in FIGS. 15 and 16, when the oblique side length ratio (the ratio (%) of the oblique side length of each of the second oblique surfaces 6b to the total oblique side length) was set at 100% (a in FIGS. 15 and 16), a luminance difference between both ends of the light emitting surface 2d was large, and luminance on the light entering end face 2a side looked dark apparently.

As described above, with the lighting device 1 having the light guide plate 2 according to the second embodiment, light which emits from the light emitting surface 2d can also shine on an area immediately below the lighting device 1 with high illuminance, brightness unevenness on the light emitting surface in an oblique view is eliminated, and deterioration of external appearance can be prevented.

CROSS-REFERENCE TO RELATED APPLICATIONS

The present application claims the benefit of Japanese Patent Application No. 2013-124441, filed in Japan on Jun. 13, 2013, the entire contents of which are hereby incorporated by reference.

The invention claimed is:

1. An edge light-type lighting device wherein a primary light source is installed on at least one side face side of a light guide plate, the light guide plate having a light emitting surface, a bottom surface facing the light emitting surface, and a light entering end face through which light emitted from the primary light source installed on at least one side face enters, wherein when defining a normal line of an X-Y plane composed of an X axis and a Y axis perpendicular to the X axis as a Z axis, the primary light source is disposed parallel to the X axis, the light guide plate is disposed parallel to the X-Y plane, and the light entering end face of the light guide plate is parallel to an X-Z plane, the light guide plate has a plurality of recessed strip patterns, which are formed on the bottom surface at a predetermined pitch and are parallel to the X axis direction, and a plurality of protruded strip patterns, which are formed on the light emitting surface at a predetermined pitch and are parallel to the Y axis direction, each of the recessed strip patterns has first oblique surfaces on an inner side and second oblique surfaces, which are continuous with the first oblique surfaces and have an outward opening, in a cross section parallel to a Y-Z plane, and has a stepped V shape wherein a vertical angle formed by the first oblique surfaces facing each other is set in a range of 95° to 110° while an apparent vertical angle formed between the second oblique surfaces facing each other is set in a range of 60° to 75°, and when defining one side of each of the first oblique surfaces as a first oblique side and one side of each of the second oblique surfaces as a second oblique side in a cross section parallel to the Y-Z plane and defining a total length of the continuous first oblique side and second oblique side as a total oblique side length, a ratio of an oblique side length of the second oblique side to the total oblique side length is set in a range of 40% to 65%.

2. The lighting device according to claim 1, wherein each of the protruded strip patterns formed on the light emitting surface of the light guide plate has a trapezoidal, lenticular lens-shaped or parabolic cross section.

3. The lighting device according to claim 1, wherein a reflection sheet which reflects light is provided on a bottom surface side of the light guide plate, and a diffusion sheet which uniformly diffuses light is provided on a light emitting surface side of the light guide plate.

4. The lighting device according to claim 1, wherein a reflection sheet which reflects light is provided on a bottom surface side of the light guide plate.

5. The lighting device according to claim 2, wherein a reflection sheet which reflects light is provided on a bottom surface side of the light guide plate, and a diffusion sheet which uniformly diffuses light is provided on a light emitting surface side of the light guide plate.

6. The lighting device according to claim 2, wherein a reflection sheet which reflects light is provided on a bottom surface side of the light guide plate.

\* \* \* \* \*